US010476895B2

(12) United States Patent
Hebert

(10) Patent No.: US 10,476,895 B2
(45) Date of Patent: Nov. 12, 2019

(54) INTRUSION DETECTION AND RESPONSE SYSTEM

(71) Applicant: SAP SE, Walldorf (DE)

(72) Inventor: Cédric Hebert, Mougins (FR)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 15/263,037

(22) Filed: Sep. 12, 2016

(65) Prior Publication Data

US 2018/0077174 A1 Mar. 15, 2018

(51) Int. Cl.
*H04L 29/00* (2006.01)
*H04L 29/06* (2006.01)
*G06F 21/55* (2013.01)

(52) U.S. Cl.
CPC ........ *H04L 63/1416* (2013.01); *G06F 21/554* (2013.01); *H04L 63/1425* (2013.01); *H04L 63/1441* (2013.01); *G06F 2221/034* (2013.01)

(58) Field of Classification Search
CPC ............. H04L 63/1416; H04L 63/1425; G06F 21/554
USPC .......................................................... 726/23
See application file for complete search history.

(56) References Cited

U.S. PATENT DOCUMENTS

| 7,793,138 | B2 * | 9/2010 | Rastogi | H04L 67/1097 714/4.1 |
| 7,904,959 | B2 * | 3/2011 | Sidiroglou | G06F 21/554 726/22 |
| 8,925,080 | B2 | 12/2014 | Hebert | |
| 2010/0138931 | A1 * | 6/2010 | Thorley | G06F 21/552 726/27 |

* cited by examiner

*Primary Examiner* — Brandon S Hoffman
*Assistant Examiner* — Michael D Anderson
(74) *Attorney, Agent, or Firm* — Sterne, Kessler, Goldstein & Fox P.L.L.C.

(57) ABSTRACT

Disclosed herein are system, method, and computer program product embodiments for intrusion detection and response. An embodiment operates by receiving one or more events corresponding to one or more user actions performed during a connectivity session to a computer system. The received one or more events are compared to one or more intrusion parameters associated with the computer system. It is determined that the received one or more events correspond to the intrusion event and that the user actions are performed on a first version of the computer system. The connectivity session is switched from the first version of the computer system to a second version of the computer system responsive to the determination of the intrusion event.

20 Claims, 4 Drawing Sheets

INTRUSION DETECTION AND RESPONSE SYSTEM

BACKGROUND

Maintaining the security of computer systems against would-be attackers is an important and complex task. However, the task of maintaining system security is often left to one-size-fits-all solutions, such as firewalls with usernames and passwords, which can be deployed across multiple different computing systems regardless of the complexities and features of any particular system. One of the problems that often arises, however, is that hackers and other would-be attackers may be able to gain familiarity with these one-size-fits-all solutions and defeat the firewall. And, once the attacker gains system access, there may be no additional security measures in place to detect or repel a potential attack to or from inside the system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for intrusion detection and response.

Figure 1:
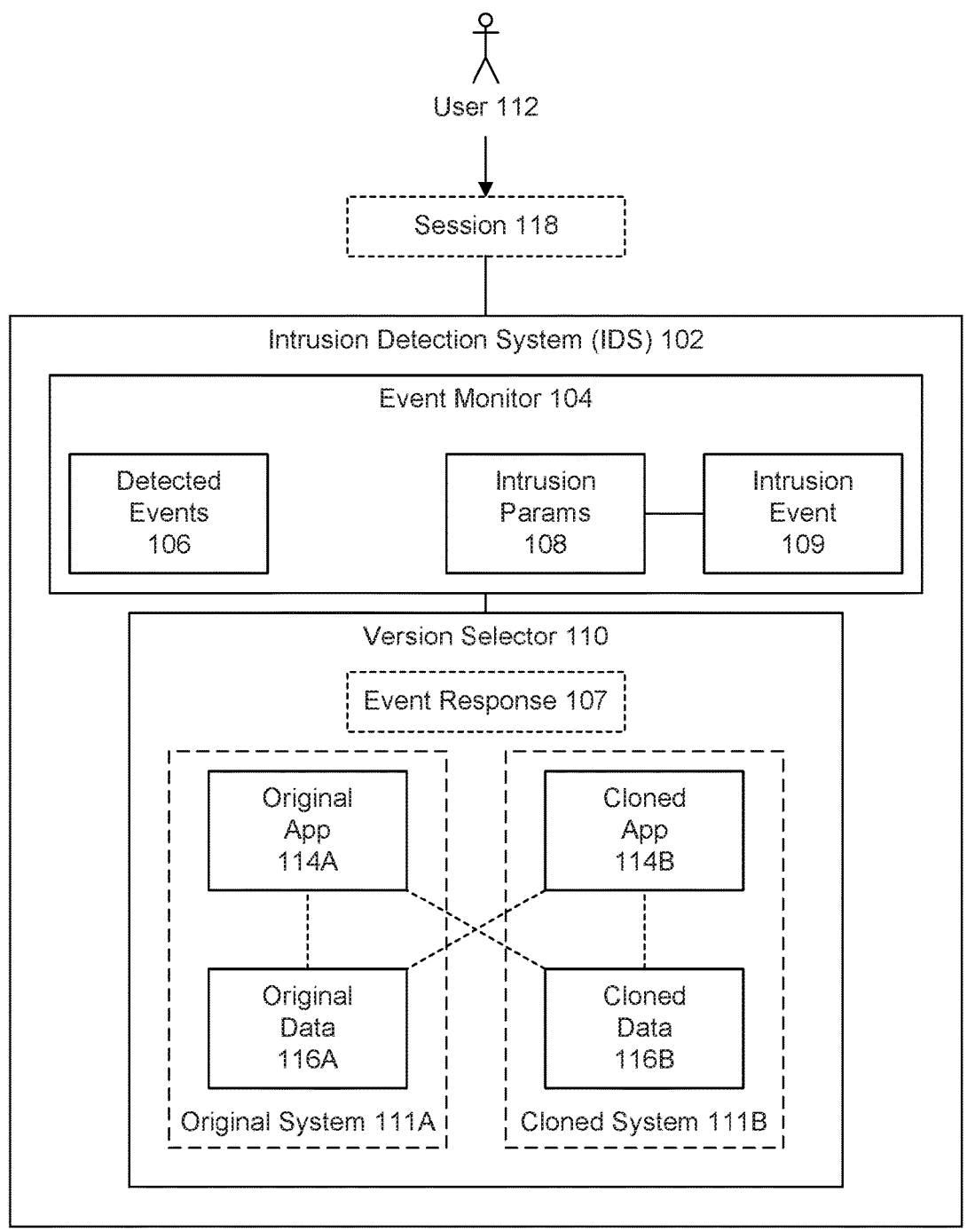
FIG. 1 is a block diagram of an intrusion detection and response system, according to an embodiment.

FIG. 1 is a block diagram of an intrusion detection and response system 100, according to an example embodiment. An intrusion detection system (IDS) 102 monitors a computing system for suspicious activity. The computing system may include front-end and/or back-end applications operating across one or more networked computers (including a cloud platform environment on either the server-side or client side), databases, and other related or connected systems or machines. The computing system may also include devices that are communicatively coupled or otherwise authorized to access the system, such as mobile device or other user terminals.

IDS 102 may include an event monitor 104 that monitors the actions of users 112 (e.g., detected events 106) to determine whether or not any suspicious activity is taking place. Event monitor 104 may compare detected events 106 with a set of intrusion parameters 108 to determine whether or not an intrusion event 109 has occurred on one or more computers or applications of the system.

Detected events 106 may include any actions performed by a user 112 during one or more connectivity or computing sessions 118. An example event 106 may include an authentication action such as a login attempt (failed or successful) and may include information about the action, such as time, date, IP (internet protocol) address, device type, username, password, count of tries, frequency, etc. Or for example, event 106 may include multiple actions of different combinations of actions, such as multiple login attempts.

Events 106 may also include post-authentication actions performed with regard to use of the original application 114A and original data 116A. Other example events include, but are not limited to, SQL queries, copy/delete/add and any other modification requests to data, any actions such as button presses or menu selections from within application 114A, time since previous activity, copy/cut and paste requests, or any other actions that may be interesting or may be detected from use of application 114A and/or data 116A (which may reside across one or more databases). Events 106 may span multiple user sessions 118 and may be combined across different user accounts or related applications 114, data 116, or systems 111.

An intrusion event 109 may be any activity that is deemed unauthorized, unusual, or otherwise suspicious for a user to perform. Intrusion parameters 108 may define what user action(s) correspond to one or more intrusion events 109. Example categories of intrusion events 109 include without limitation determining when an unauthorized user 112 has gained access to the computing system or an authorized user 112 who may be attempting to perform unauthorized or unusual activity. Intrusion parameters 108 define which activity (events 106) corresponds to which unusual activity or intrusion events 109.

An intrusion event 109 could be any action or set of actions taken by one or more users 112 over one or more sessions 118 that indicate suspicious activity is or may be taking place on a computing system (e.g., original app 114A and/or original data 116A). Example intrusion events 109 may include multiple login attempts from the same IP address with different user names, multiple login attempts and failures with the same username, attempts to perform unauthorized commands (e.g., such as user 112 trying to create new user accounts which is known to be an administrative privilege), the performance or attempted performance of unusual activity (such as performing queries directly on data of a database storing original data 116A, when users generally access the data via original app 114A), and accessing data 116A not generally accessed by user 112.

Intrusion parameters 108 may include a criterion that is applied by event monitor 104 to events 106 to determine whether or not an intrusion event 109 has occurred. Each intrusion event 109 may include one or more intrusion parameters 108. Event monitor 104 compares detected events 106 against intrusion parameters 108 to determine whether any and/or which intrusion event 109 has occurred. Intrusion parameters 108 may define or specify which events 106 action or set of events 106 detected as being performed by one or more users 112 (e.g., user names) over one or more sessions 118 indicate suspicious activity related to an intrusion event 109.

In an embodiment, a developer or system architect may determine or define intrusion parameters 108 that indicate that suspicious or unauthorized activity has or is about to occur. Intrusion parameters 108 may use or include any information available to define an intrusion event 109 including device type, time/date of event 106, IP address(es), usernames, frequency or count of occurrences, or other information. Example intrusion event parameters 108 may include a threshold for a number of failed login attempts associated with a particular username, particular IP address, or within a specified period of time, a set of data that is deemed restricted which if attempted to be accessed indicates an intrusion event 109, data modification or access requests made directly on a database-level by non-database administrators (as opposed to be performed via original app 114A), a similar function being attempted by the same username on two different IP addresses during different sessions 118, or a set of functions being performed by different usernames within a specified time interval.

Figure 2:
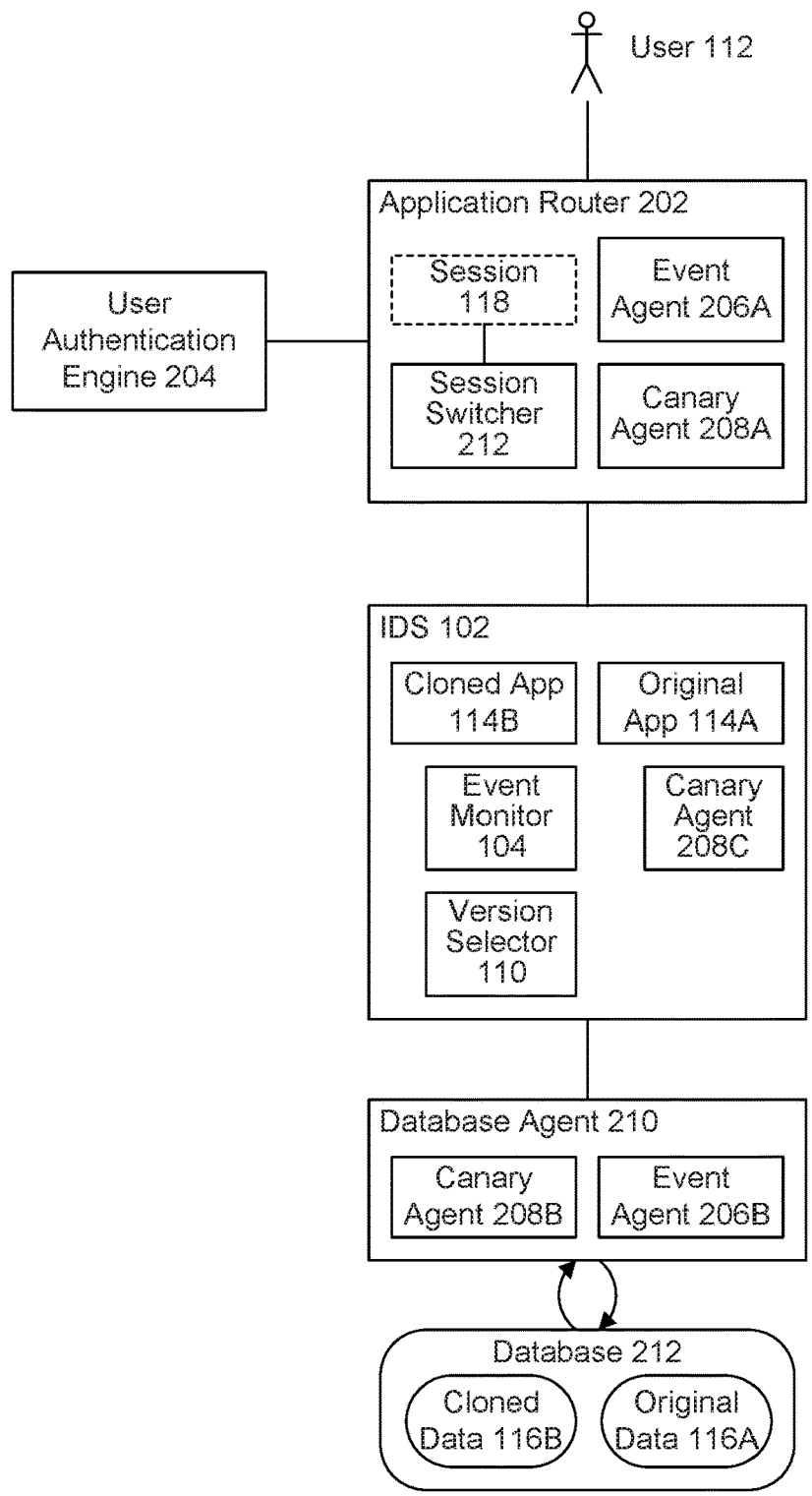
FIG. 2 is a block diagram of an intrusion detection and response system, according to an embodiment.

As described in greater detail with respect to FIG. 2, different event agents (206, 208) may be responsible for detecting different events based on which user 112 is performing the action, the session 118 associated with the action, or the particular system 111 (including application 114 and/or data 116A) on which the action was detected. However, regardless of which agent(s) detect the event 106, if an intrusion event 109 is determined, an event response 107 associated with the event 106 may either be the same across all agents or may vary based on which agent detected the event 109.

In an embodiment, different systems 111A (including original applications 114A and original data 116A) may have different detected events 106 and/or intrusion events 109 particular to the nature of the system and/or data. For example, a stock trading application 116A may have different events 106, 109 than a human resources application 116A. In an embodiment, two different applications 114A may have the same intrusion event 109 defined by two different set of intrusion params 108, unique to each system 111A.

In an embodiment, event monitor 104 may be registered to receive a stream of detected events 106 and may determine whether or not an intrusion event 109 has been detected. If an intrusion event 109 is determined, IDS 102 may respond accordingly to repel the attack, prevent further unauthorized access, and monitor the user's actions as determined based on event response 107.

If event monitor 104 determines that detected event(s) 106 do not meet intrusion params 108 and that no intrusion event 109 has occurred (e.g., and normal operations are being performed), then a version selector 110 may provide user 112 access to an original system 111A via the user's connectivity session 118. Original system 111A may be a genuine, authentic, original, or production version of an application 114A with real customer or other data 116A that the user may use or access to perform authorized activities.

If, however, event monitor 104 determines that an intrusion event 109 has occurred, then IDS 102 may respond in a variety of different ways depending on the nature, category, or severity of the detected intrusion event 109. Event response 107 may indicate how IDS 102 is to respond to different intrusion events 109.

Event response 107 may include one or more pre-defined and/or dynamically determined system responses on how IDS 102 is to respond to different intrusion events 109. Event responses 107 may be determined ahead of time, during application development, or in real-time based on which events 106 are detected. For example, if the event 106 is not an intrusion event 109, then version selector 110 may provide a user 112 (connected through a session 118) with access to an original version of an application 114A and original data 116B.

Version selector 110 may switch (or signal a session switcher to switch) the connectivity session 118 of the user 112 from original system 111A to a second, cloned version of the system 111B based on an event response 107 corresponding to the detected intrusion event 109. For example, access to the original system 111A (original app 114A and/or original data 116A) may be disabled, while access to the cloned system 111B (cloned app 114B and/or data 116B) may be enabled.

Cloned system 111B may include features specifically developed and implemented for suspected attacks against original system 111A. For example, during design time or at other stages of the product development cycle, a developer or system architect may anticipate different possible attacks on an original or production system 111A. The attacks may include both authentication attacks (trying to gain system attacks) and insider attacks (suspicious actions that may be performed by users 112 who have gained access to system 111A). Attacks across different systems 111A may vary based on the particularities of the system (e.g., app 114A and/or data 116A). For example, an attack on a stock trading system may be different than an attack on human resources system which may be different from an attack on a sales system with customer data. A designer or architect may be familiar with the particularities and may be able to anticipate attacks on particular features or vulnerabilities (including sensitive or confidential data) better than a one-size-fits-all solution.

Based on the various possible attacks, different clones 111B (e.g., versions of original app 114 and/or original data 116A) may be created as cloned app 114B and cloned data 116B. Each clone 111B may include either cloned app 114B and/or cloned data 116B, and may designed or created to repel against one or more attacks on original system 111A. In an embodiment, cloned app 114B may connect to original data 116A and/or cloned data 116B. In another embodiment, a cloned system 111B may include original app 114A connected to cloned data 116B and/or a portion of original data 116A. Cloned app 114B may include its own copy or reference portions of original app 114A, and cloned data 116B may include its own copy or reference portions of original data 1116A. These cloned systems 111B may also include features that are not part of the original system 111A, such as traps, honeypots, and canary events (including fabricated or non-original data) particularly designed to repel attacks on original system 111A or trick attackers into thinking they are gaining access to original system 111A.

In an embodiment, a honeypot may be a functional module, or one or more system components, specifically designed and intended to allow attackers or would-be attackers to gain access to the honeypot. Example honeypots may include fabricated (not on original system 111A) administrative tools, or access to browser cookies that are not being used for other system 111A functionality. In an embodiment, a canary may be an application-specific trap or event that indicates an intrusion event 109 has occurred. An example canary may be a new (fabricated) data table created in cloned data 116B that does not exist in original data 116A, such that an authorized user would not access or even attempt to access the data in hew new table provided his/her role or access level. As such, if the canary data or functionality is accessed, IDS 102 may determine that an intrusion event 109 has occurred (based on the triggering of the canary event). A trap may be any other feature included to determine whether or not user 112 is performing suspicious activity or to prevent user 112 from accessing features of original system 111A.

In an embodiment, cloned system 111B may operate in a manner so as to resemble the operations, flow, or interface of original system 111A such that the user 112 (e.g., would-be intruder or unauthorized user) may be unaware of any visible or obvious differences in flow or functionality. Cloned system 111B may include operational functionality identical or similar to original app 114A and/or real data 116A of original system 111A. Cloned system 111B may be designed to cause user 112 to believe he/she has gained access to original system 111A. Rather than simply expelling an unauthorized user (whose username may be associated with a detected suspicious activity) out of the system 111A (e.g., or otherwise denying access to the user), IDS 102 may grant user 112 with access to one or more of these additional clones 111B.

During the course of a single session 118, version selector 110 may switch enable and disable access between multiple or different versions of clones 111B based on operational flow and/or which events 106 are detected, intrusion parameters 108 are satisfied, and/or intrusion events 109 are detected. User 112 however may be unaware (is not notified) as to which version of a system (original system 111A or clone 111B) the user has current access. Clones 111B may have a user interface or database structure that is identical or otherwise similar to original system 111A. In this manner, when connectivity session 118 is switched between original system 111A and one or more clones 111B, user 112 may be unaware that such a switch has taken place.

Granting a detected unauthorized user access to a falsified version (e.g., clone 111B) of the data and/or application of original system 111A may allow IDS 102 to monitor the user's activity to determine what techniques are being employed and what system resources or data are trying to be accessed by user 112 without risking harm to original system 111A. This collected data may then be used to implement additional security features and prevent future attacks, thus improving system security. Further, any time spent by an unauthorized user 112 in a clone 111B is time not spent by the user 112 not attacking the real or original system 111A.

In an embodiment, an authentication intrusion event 109 may determine, based on a threshold number of login attempts using one or more usernames or from one or more identified IP addresses or devices, that a particular user 112 is attempting to gain unauthorized access to original system 111A (as defined by intrusion params 108). For example, a user may try different username and password combinations. Intrusion params 108 may indicate a threshold number of attempts before an intrusion event 109 and event response 109 is triggered.

Rather than preventing user 112 from accessing system 111A (which may be one event response 107), event response 107 may indicate that user 112 may be granted access to cloned system 111B. The user's actions on cloned system 111B may then be monitored to determine what information or actions the user is attempting to retrieve or access. This information may then be used to bolster system security. Further, the username and password, IP address, and/or device-type combination that were granted cloned access may then be registered as an intrusion event 109. Then, for example, the next time the username and password is tried, or a different username/password combination (even if invalid) is tried from the same IP address, the user 112 may be granted access to one or more versions of cloned system 111B and monitored.

Through session 118 switching, IDS 102 provides a deception that creates the illusion that would-be intruders (e.g., user 112) are gaining access to the original system 114A, 116A when in fact they are being provided access to a cloned version 114B, 116B by switching sessions 118 to different versions of the application and/or data without the user 112 knowing. IDS 102 may then monitor, track, or record the actions and events triggered by user 112 and not only use this information to improve system security, but also the time spent by user 112 in cloned system 114B, 116B is time not spent attacking the original system 114A, 116A providing yet another advantage and additional security by IDS 102.

FIG. 2 is a block diagram of an intrusion detection and response system 200, according to an example embodiment. User 112 may login and establish connectivity session 118 through an application router 202. Application router 202 may include a gateway or firewall operating on one or more routers or other computing devices. In an embodiment, user 112 gains access to original app 114 via a connection through application router 202.

In an embodiment, user 112 may need to authenticate his/her credentials to gain access or otherwise establish connectivity or access to an original system (e.g., original app 114A and/or original data 116A) via a session 118. User 112 may be requested or may provide a username and password, login from an authorized device or IP address, or other credential information to satisfy some security protocol (including biometric authorization). User authentication engine 204 may use the provided or retrieved credential information to determine whether or not to authorize or enable user 112 access (including what level of access) to original system, cloned system (e.g., cloned app 114B or cloned data 116B), or deny access. In an embodiment, different users 112 may have or be assigned different roles that allow them to access different data 116A and/or functionality of application 114A. If user authentication engine 204 authenticates the user login or credential information, application router 202 through session switcher 212 may establish connectivity session 118 granting user 112 a determined level of access to applications 114A, 114B and data 116A, 116B.

At any point during connectivity, even upon authentication or upon determination of an authentication intrusion event, session switcher 212 may determine which version of an application to grant or enable access (e.g., original app 114A, cloned app 114B, original data 116A, and cloned data 116B). Session switcher 212 may switch the versions multiples times during the course of one or more user sessions 118. In an embodiment, version selector 110 may signal session switcher 212 to which version to enable access based on event response 107.

Event agents 206A, 206B may record, track, or otherwise monitor user activity on applications 114A, 114B, data 116A, 116B and during the authentication process. An event (e.g., detected event 106) may include any input provided by user (including keystrokes, mouse clicks, menu or other graphical user interface selections, requested commands) and information that is associated with the input (e.g., time, date, user device type, IP address, etc.). Different event agents 206 may record or detect events on different devices or with regard to different systems. For example, event agent 206A may detect authentication, login, connectivity, and session events. Meanwhile, event agent 206B may record or detect events or user actions performed with regard to data on database 112. These data events may include access or modification (add, delete, modify) requests performed directly on database 112 or via applications 114A, 114B.

Database agent 210 may provide user access (e.g., via session 118) to database 212 including original data 116A and one or more versions of cloned data 116B. Event agent 206B may monitor, record, or track which action(s) are performed (or attempted to be performed) during the connectivity either directly on database 212 or indirectly through apps 114A, 114B. Event agents 206A, 206B may provide these detected events to IDS 102.

In an embodiment, event agent(s) 206 may provide events to multiple or different IDSs 102. For example a first IDS 102 may operate with regard to a first original app 114A, while a second IDS 102 may operate with regard to a second, different original app 114A (which may or may not be related, communicatively coupled to the first original app 114A). As such, the first and second IDS 102 may share one or more event agents 206. As such, each IDS 102 may register to receive whichever event(s) are relevant to the particular IDS 102 (which may be determined based on which intrusion events 109 have been defined based on intrusion parameters 108 for each application 114A). As such, different IDSs 102 may receive different events from event agents 206A and 206B.

Canary agents 208 may be specialized event agents (e.g., 206). In an embodiment, canary agents 206 may be application 114 or IDS 102 specific. Canary agents 206 may monitor for specific user action(s) over one or more sessions 118 and performed by one or more users 112 that are determined to be intrusion events 109. Upon the detection of these actions, canary agent 208 may notify the appropriate IDS 102 that a canary event (e.g., particular intrusion event 109) has occurred. In an embodiment, IDS 102 would not have to compare the events received from canary agents 208 to intrusion parameters 108, because the notification by canary agent 208 would signal that a positive intrusion event 109 has been detected. IDS 102 may then respond accordingly to the canary event (e.g., based on a predefined event response 107).

A canary event may include functionality, data, or other features included on application router 202, in cloned app 114B, or cloned data 116B that if triggered, accessed, or that is specifically included to generate an intrusion event is accessed (or is attempted to be accessed) by user 112. In an embodiment, a canary event may be a trap set by a developer or architect based on anticipated action(s) that may be taken by a hacker (as opposed to an authorized user).

A canary event detected by a canary agent 208 may differ from an event detected by an event agent 206 in that a canary event may be application specific, and may take into account expected, normal, or anticipated user behavior when using a particular application 114. For example, a general event may include a user performing an SQL query on data 116A, which may or may not trigger an intrusion event on different applications. While, for example, a canary event may include a user attempting to access a database table that if accessed generates an intrusion event. The accessed database table may have been registered with canary agent 208B as being a canary event. In an embodiment, canary agent 206B may notify IDS 102 of the canary event and IDS 102 may respond accordingly. In an embodiment, a canary event may be a true indication of an intrusion event 109, while events detected by event agents 206 may include one or more false positive identifications of intrusion events 109 (e.g., actions which may resemble actions by a system attacker, but may have been incidental or legitimate actions performed by one or more users 112).

Figure 3:
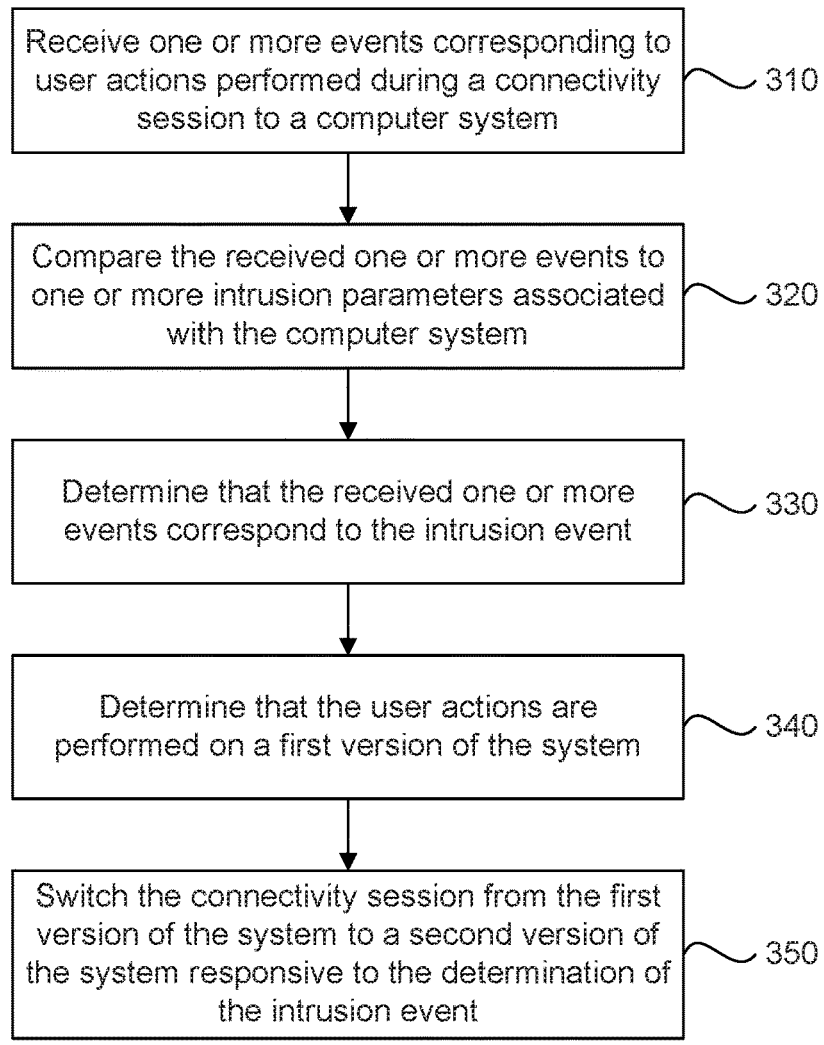
FIG. 3 is a flowchart illustrating a process for responding to intrusion events, according to an embodiment.

FIG. 3 is a flowchart illustrating a process for responding to intrusion events, according to an example embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, one or more events corresponding to user actions performed during a connectivity session to a computer system are received. For example, event monitor 104 may receive detected events 106 which may include general or canary events. In an embodiment, pre-authentication events (such as login failures) may be received prior to establishment of a session 118.

At 320, the received one or more events are compared to one or more intrusion parameters associated with the computer system. For example, event monitor 104 may check whether detected events 106 correspond to criteria (intrusion params 108) that amount to the occurrence of an intrusion event 109. In an embodiment, a canary event may correspond to an indication an intrusion event 109 has occurred without a need to perform a check against intrusion parameters 108. For example, a canary agent 208 may signal that a particular canary intrusion event 109 has occurred.

At 330, it is determined that the received one or more events correspond to the intrusion event. For example, based on the comparison, event monitor 104 may determine whether a set of one or more detected events 106 which may include events or actions performed over different session 118 by different users 112 within a specified time interval correspond to an intrusion event 109. If no intrusion event 109 is detected, no more responsive action may be performed by IDS 102.

At 340, it is determined that the user actions are performed on a first version of the system. For example, if intrusion event 109 is detected, version selector 110 may determine that the actions occurred on original application 114A or original data 116A.

At 350, the connectivity session is switched from the first version of the system to a second version of the system responsive to the determination of the intrusion event. For example, version selector 110 may implement an event response 107 corresponding to the intrusion event 109 (including a canary event). Version selector 110, via session switcher 212, may enable access to one or more cloned versions of application 114B or data 116B while disabling access to original app 114A or original data 116A. The session ID corresponding to session 118 may remain the same, and the switch may be performed without any user notification.

Figure 4:
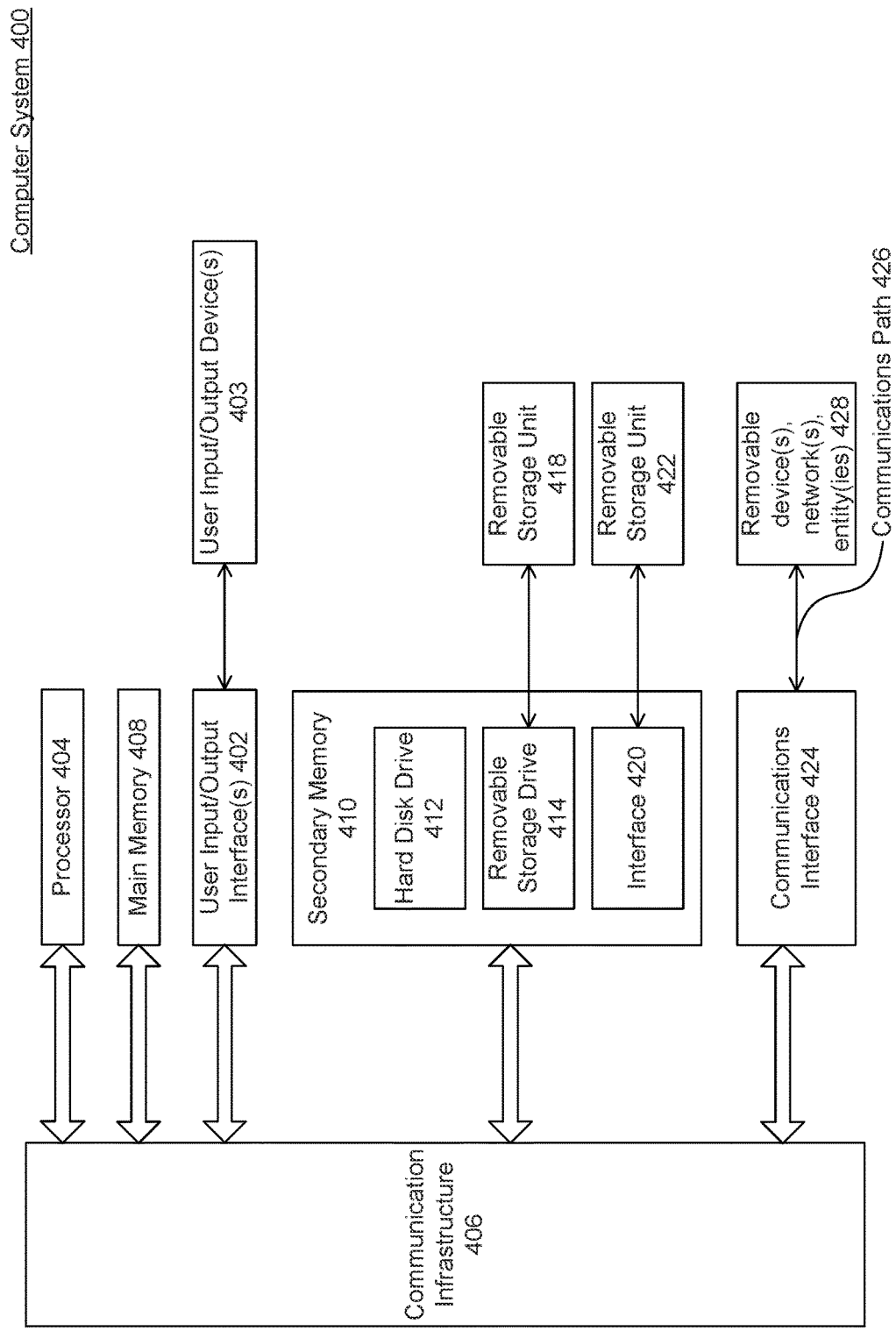
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving a plurality of events corresponding to one or more user actions received from one or more computing devices during each of a plurality of connectivity sessions to a computer system, wherein each of the plurality of connectivity sessions comprises one or more of the one or more user actions corresponding to the plurality of events;
   comparing the received plurality of events to one or more intrusion parameters associated with the computer system, wherein the intrusion parameters comprise criteria that indicates whether the plurality of events correspond to an intrusion event;
   determining, based on the comparison, that the received plurality of events across the plurality of connectivity sessions correspond to the intrusion event;
   determining that one or more of the one or more user actions are performed on a first version of the computer system during a particular connectivity session of the plurality of connectivity sessions; and switching, by a version selector, the particular connectivity session from the first version of the computer system, to which a first one or more of the computing devices was connected, to a second version of the computer system responsive to the determination of the intrusion event, wherein the second version of the computer system includes one or more features designed to prevent access one or more resources included in the first version of the computer system based on the intrusion event.

2. The method of claim 1, further comprising receiving one or more additional events corresponding to additional user actions performed during the particular connectivity session on the second version of the system.

3. The method of claim 1, wherein the one or more resources of the first version includes original data corresponding one or more customer accounts as maintained by a database of the computer system, wherein the one or more features of the second version includes at least one or more portions of the original data that has been changed such that it does not correspond to the one or more customer accounts.

4. The method of claim 3, wherein the one or more features of the second version includes new data that is not part of the original data.

5. The method of claim 4, further comprising:
receiving one or more events corresponding to one or more additional user actions requesting access to the new data; and
tracking the one or more additional user actions.

6. The method of claim 1, wherein the intrusion parameters include criteria corresponding to a plurality of intrusion events, and wherein the switching comprises determining, in real-time, whether to switch the particular connectivity session to the second version of the computer system or a third version of the computer system based on the determined intrusion event, wherein the third version of the computer system is designed provide access to one or more resources not included on the first version or second version of the computer system.

7. The method of claim 1, wherein the receiving one or more events comprises:
receiving a canary event corresponding to an action performed on a first application of a plurality of applications of the computer system, wherein the canary event associated with the first application corresponds to the intrusion event.

8. The method of claim 1, wherein the receiving one or more events comprises:
registering to receive the one or more events from event agent, wherein the one or more events are associated with a first application of the computer system, and wherein one or more events associated with a second application of the computer system are not received based on the registration.

9. The method of claim 1, wherein the receiving one or more events comprises:
determining that receiving the one or more events over the plurality of connectivity sessions correspond to a single username associated with the computer system.

10. A system, comprising:
a non-transitory memory; and
at least one processor coupled to the memory and configured to perform operations comprising:
receiving a plurality of events corresponding to one or more user actions received from one or more computing devices during each of a plurality of connectivity sessions to a computer system, wherein each of the plurality of connectivity sessions comprises one or more of the one or more user actions corresponding to the plurality of events;
comparing the received plurality of events to one or more intrusion parameters associated with the computer system, wherein the intrusion parameters comprise criteria that indicates whether the plurality of events correspond to an intrusion event;
determining, based on the comparison, that the received plurality of events across the plurality of connectivity sessions correspond to the intrusion event;
determining that one or more of the one or more user actions are performed on a first version of the computer system during a particular connectivity session of the plurality of connectivity sessions; and
switching, by a version selector, the particular connectivity session from the first version of the computer system, to which a first one or more of the computing devices was connected, to a second version of the computer system responsive to the determination of the intrusion event, wherein the second version of the computer system includes one or more features designed to prevent access one or more resources included in the first version of the computer system based on the intrusion event.

11. The system of claim 10, wherein the determining based on the comparison comprises determining that a first one of the events is received a threshold number of times, wherein a receipt of the first event greater than or equal to the threshold indicates the intrusion event.

12. The system of claim 10, wherein the operations further comprise receiving one or more additional events corresponding to additional user actions performed during the particular connectivity session on the second version of the system.

13. The system of claim 10, wherein the one or more resources of the first version includes original data corresponding one or more customer accounts as maintained by a database of the computer system, wherein the one or more features of the second version includes at least one or more portions of the original data that has been changed such that it does not correspond to the one or more customer accounts.

14. The system of claim 13, wherein the one or more features of the second version includes new data that is not part of the original data.

15. The system of claim 14, wherein the operations further comprise:
receiving one or more events corresponding to one or more additional user actions requesting access to the new data; and
tracking the one or more additional user actions.

16. The system of claim 10, wherein the intrusion parameters include criteria corresponding to a plurality of intrusion events, and wherein the switching comprises determining, in real-time, whether to switch the particular connectivity session to the second version of the computer system or a third version of the computer system based on the determined intrusion event, wherein the third version of the computer system is designed provide access to one or more resources not included on the first version or second version of the computer system.

17. The system of claim 10, wherein the receiving one or more events comprises:
registering to receive the one or more events from event agent, wherein the one or more events are associated with a first application of the computer system, and wherein one or more events associated with a second application of the computer system are not received based on the registration.

18. A tangible computer-readable device having instructions stored thereon that, when executed by at least one computing device, causes the at least one computing device to perform operations comprising:
receiving a plurality of events corresponding to one or more user actions received from one or more computing devices during each of a plurality of connectivity sessions to a computer system, wherein each of the plurality of connectivity sessions comprises one or more of the one or more user actions corresponding to the plurality of events;
comparing the received plurality of events to one or more intrusion parameters associated with the computer system, wherein the intrusion parameters comprise criteria that indicates whether the plurality of events correspond to an intrusion event;
determining, based on the comparison, that the received plurality of events across the plurality of connectivity sessions correspond to the intrusion event;
determining that one or more of the one or more user actions are performed on a first version of the computer system during a particular connectivity session of the plurality of connectivity sessions; and
switching, by a version selector, the particular connectivity session from the first version of the computer system, to which a first one or more of the computing devices was connected, to a second version of the computer system responsive to the determination of the intrusion event, wherein the second version of the computer system includes one or more features designed to prevent access one or more resources included in the first version of the computer system based on the intrusion event.

19. The method of claim 6, wherein the switching comprises:
switching the particular connectivity session from the first version of the computer system to both the second version and the third version during the particular connectivity session, and wherein the particular connectivity session comprises a single login.

20. The method of claim 1, wherein the switching comprises:
disabling access to the first version of the computer system by the computing device, and enabling access to the second version of the computer system by the computing device.

* * * * *